(12) United States Patent
Eriksson et al.

(10) Patent No.: US 6,253,455 B1
(45) Date of Patent: Jul. 3, 2001

(54) HAND SAW HAVING A HANDLE INCLUDING A PIVOTED PROTECTOR FOR PROTECTING A BLADE

(75) Inventors: Eckhard Eriksson; Staffan Lindberg; Staffan Garras, all of Edsbyn (SE)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 09/427,755

(22) Filed: Oct. 27, 1999

(30) Foreign Application Priority Data

Oct. 27, 1998 (SE) .................................................... 9803675

(51) Int. Cl.⁷ .................................................... B27B 21/00
(52) U.S. Cl. ............................. 30/504; 30/155; 30/166.3; 30/517
(58) Field of Search ............................. 30/151, 155, 504, 30/514, 517, 153, 166.3

(56) References Cited

U.S. PATENT DOCUMENTS

| | | |
|---|---|---|
| 698,764 * | 4/1902 | Tyler .................................... 30/166.3 |
| 1,638,749 | 8/1927 | Santoyo . |
| 4,271,592 | 6/1981 | Höptner ................................. 30/153 |
| 5,093,995 * | 3/1992 | Jan ........................................ 30/155 |
| 5,647,129 | 7/1997 | Stamper ................................ 30/153 |
| 5,781,998 * | 7/1998 | Stamper ................................ 30/155 |
| 5,924,210 * | 7/1999 | Hung ..................................... 30/519 |
| 5,926,962 * | 7/1999 | Chen ..................................... 30/519 |

* cited by examiner

Primary Examiner—Hwei-Siu Payer
(74) Attorney, Agent, or Firm—Burns, Doane, Swecker & Mathis, L.L.P.

(57) ABSTRACT

A handsaw includes a blade having a toothed cutting edge pivoted to a handle. The handle includes a frame and a tooth protecting element. The tooth protecting element is pivoted to the frame to be swung between a working position and a retracted position. Each of the frame and the tooth protecting element includes a gap, whereby when the tooth protecting element is in a retracted position, the gaps are aligned to receive the blade. When the blade is in a retracted state, a portion of the cutting edge is exposed to enable purchasers or users to know what type of cutting edge is provided on the blade without having to move the blade to a working position.

7 Claims, 4 Drawing Sheets

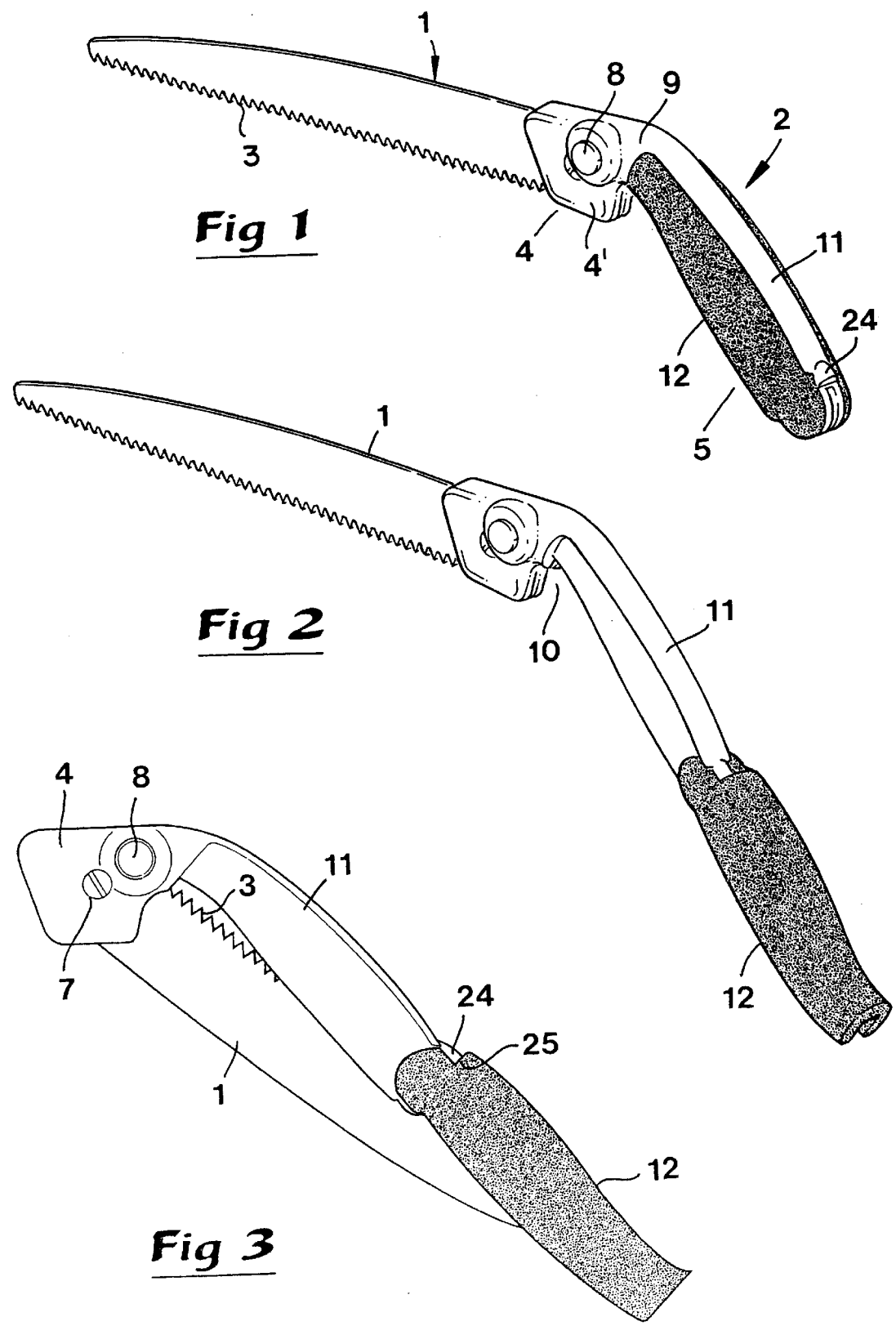

Figure 4:
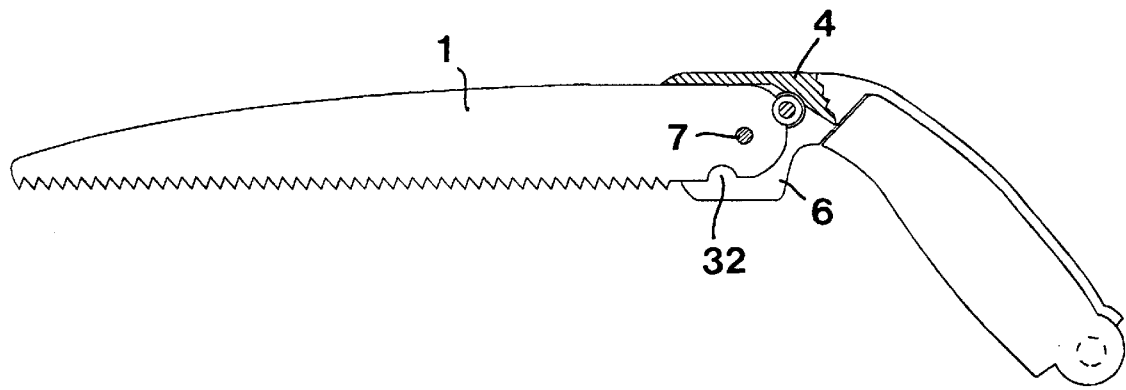

HAND SAW HAVING A HANDLE INCLUDING A PIVOTED PROTECTOR FOR PROTECTING A BLADE

TECHNICAL FIELD OF THE INVENTION

This invention relates to a handsaw. In particular a known handsaw of this type comprises a long narrow blade provided with a toothing, as well as a handle, which on one hand has a fastening part to which a rear end of the blade is connected and, on the other hand, a long narrow gripping part, which extends at an obtuse angle to the fastening part and is shorter than the blade. The blade is connected to the fastening part of the handle via a hinge which permits turning of the blade in relation to the handle between an extended position and a retracted position. A locking mechanism enables the blade to be locked in at least the extended position thereof. The gripping part is composed of a stiff frame integral with the fastening part. The frame has two side walls interconnected via a mutual back between which side walls a long narrow gap is delimited, as well as a tooth protecting element having two second side walls interconnected via a common second back. Between the second side walls a second gap is delimited, the width of which is at least equally large as the distance between the outsides of the first side walls in order to enable insertion of the frame in said second gap. The tooth protecting element is articulatedly connected to the frame via a hinge connection situated near a rear and thereof. This connection permits turning of the tooth protecting element 180° between a first position in which said second side walls surround said first side walls, and the frame together with the tooth protecting element together serve as a gripping part, and a second position in which the tooth protecting element extends in the extension of the frame and the two gaps open towards the same direction in order to receive the toothing of the blade.

BACKGROUND OF THE INVENTION

From U.S. Pat. No. 5,647,129 there is known a retractable handhold tool in the form of a knife having a long narrow, edge-provided blade which, is retractable or foldable into a handle. In a working position, the handle extends in a linear extension of the blade and includes front and rear shell-like halves that are pivoted together.

The halves can be pivoted together to form a grippable handle, or the rear shell can be swung rearwardly by 180° to enable the blade to be swung into gaps formed by the respective shells. In this case, however, the two handle halves are so provided that the edge portions on the two side walls defining a central gap in each half, are abutted against each other in the working position of the handle, whereby the handle is somewhat thick and thus more difficult to tightly grip. Furthermore, when the blade is in its retracted or stored state, the cutting edge is completely concealed, whereby a user cannot tell what type of tool is being purchased, e.g. a straight edge or a serrated edge.

OBJECTS AND SUMMARY OF THE INVENTION

The present invention aims at obviating the abovementioned inconveniences of previously known tools of the retractable type and at providing an improved handsaw. Therefore, in one aspect of the invention a handsaw has a cutting edge, a short portion of which is visible when the blade is retracted in the gripping part of the handle, for the purpose of enabling a viewer to determine that the blade is a sawblade.

In another aspect of the invention the hinge by which a tooth protecting element of the handle can be swung between a working position and a retracted position, does not extend across the blade-receiving gap formed by the handle. Thus, the blade can be inserted deeply into the gaps.

BRIEF DESCRIPTION OF THE APPENDED DRAWINGS

Figure 5:
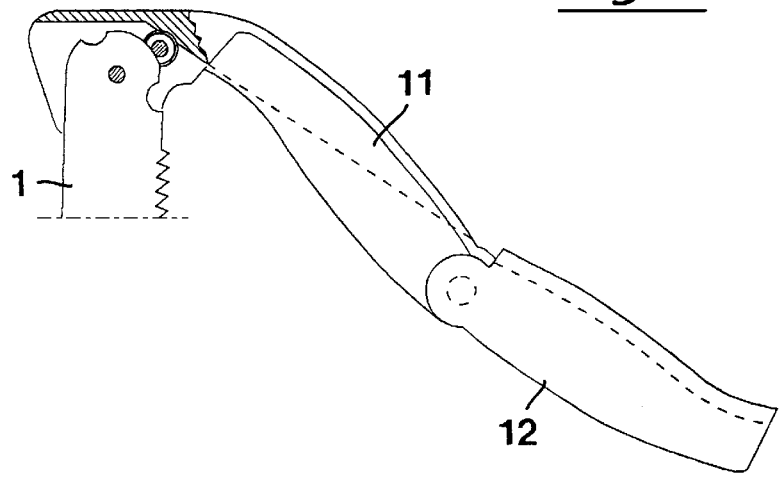
Figure 6:
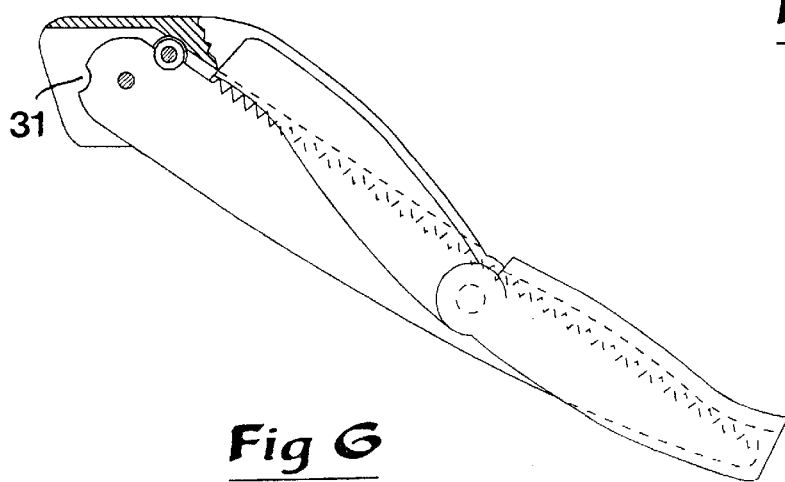
Figure 7:
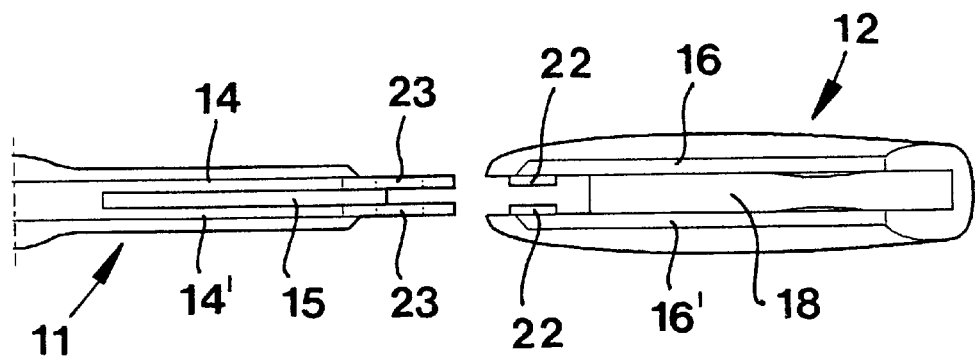
Figure 8:
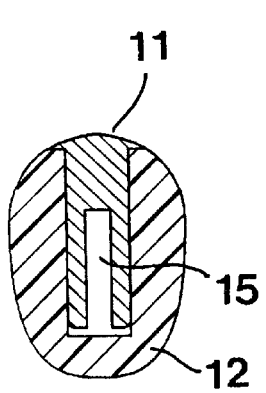
Figure 9:
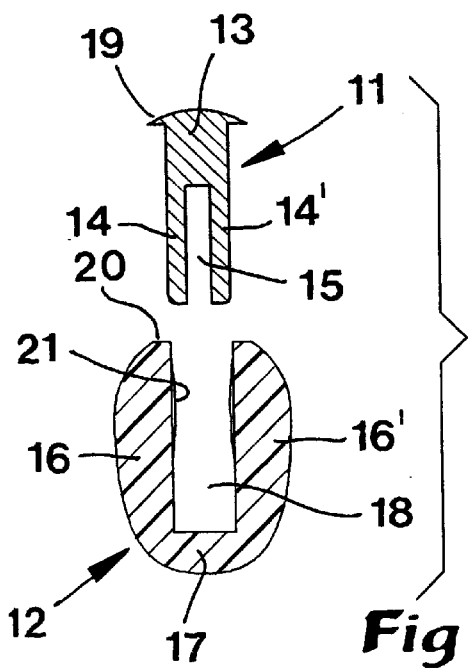
Figure 10:
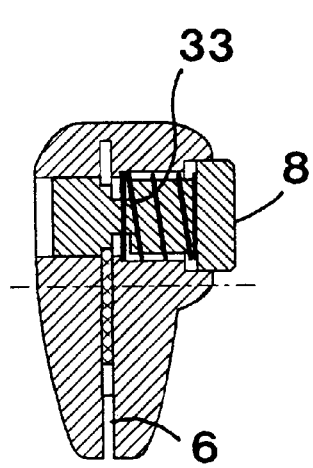
Figure 11:
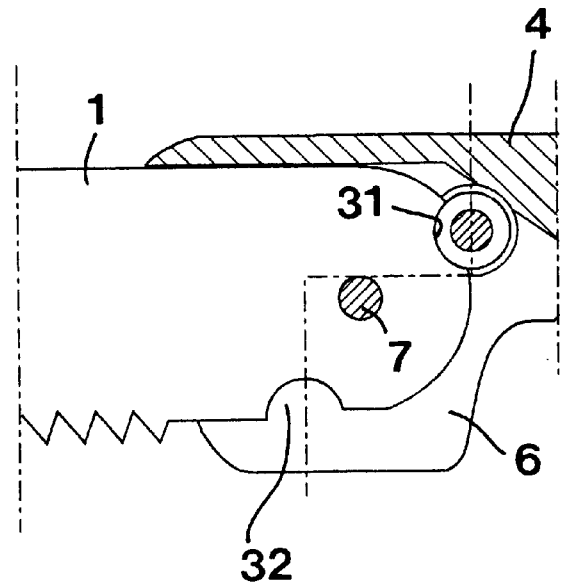
Figure 12:
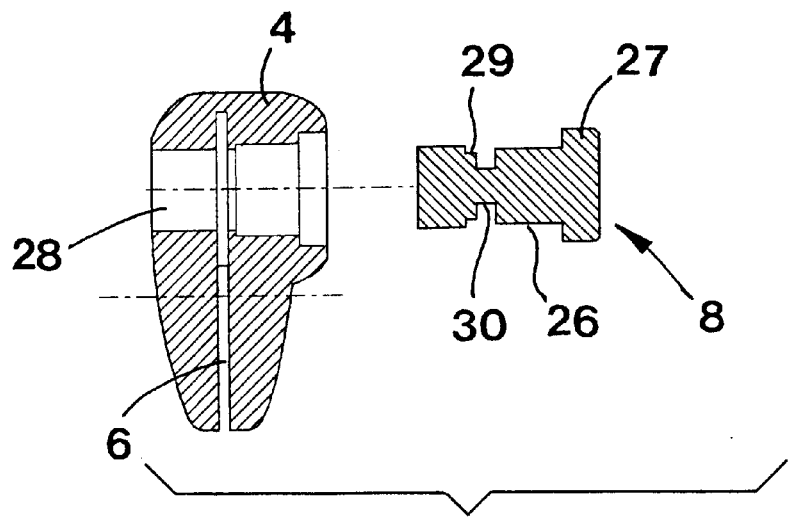

In the drawings:

FIG. 1 is a perspective view of a handsaw according to the invention in a working position in which a rear tooth protecting element included in the handle is retracted or folded forwardly towards a frame included in the gripping part of the handle, FIG. 2 is a similar perspective view showing the tooth protecting element in an extended rearward position, the blade still being locked in relation to the handle, FIG. 3 is a side elevational view showing the same saw with the blade retracted in the frame of the gripping part as well as in the tooth protecting element, FIG. 4 is a partially broken away side view showing the saw in the same state as in FIG. 1, FIG. 5 is a partially broken away side view showing the handle of the saw in the same state as in FIG. 2, although with the blade located in an intermediate position of rotation, FIG. 6 is a partially broken away side view showing the saw in the same state as in FIG. 3, FIG. 7 is an exploded bottom view showing the tooth protecting element of the handle separated from the frame, FIG. 8 is an enlarged cross-section through the handle in the state according to FIG. 1 and 4, FIG. 9 is an exploded section corresponding to FIG. 8 showing the tooth protecting element separated from the frame, FIG. 10 is a cross-section through the fastening part of the saw handle, showing a locking mechanism for locking the blade, FIG. 11 is a partially broken away side view showing the co-operation of the locking mechanism with the blade, and FIG. 12 is an exploded cross-section corresponding to FIG. 10 showing a tenon included in the locking mechanism separated from the fastening part of the handle.

DETAILED DESCRIPTION OF PREFERRED EMBODIMENTS OF THE INVENTION

In FIGS. 1–6 a handsaw is shown, the main components of which consist of a long narrow blade 1 and a handle 2. In a known way, the cutting edge of the blade 1 includes a toothing 3 which advantageously, though not necessarily, is substantially straight. The handle 2 includes a fastening part 4 as well as a long narrow gripping part 5 which extends at an obtuse angle to the fastening part 4 and the blade 1 when the gripping part 5 assumes the working position according to FIG. 1. In practice, the angle between the gripping part 5 and the blade may be within the range of 125–150°.

As may be seen in FIGS. 4–6, the rear end of the blade 1 is inserted into a downwardly opening slit 6 in the fastening part 4 and connected to the part 4 via a hinge 7 which permits turning of the blade. In order to lock the blade in the working position according to FIGS. 1 and 4, a locking mechanism 8 is arranged, which is described below.

The gripping part 5 merges into the fastening part 4 via a transition portion 9 which is thinner than the fastening part, whereby a lower portion 4' of the fastening part projects a distance under the transition portion so as to delimit a concave countersink 10, the depth of which corresponds generally to the normal width of a person's forefinger. Said lower portion 4' of the fastening part forms a knuckle protection which counteracts possible tendencies of the hand to slip forwardly in the direction towards the sharp teeth of the blade.

The gripping part 5 is composed of a stiff frame 11 integral with the fastening part 4, as well as a tooth protecting element 12 connected thereto. As may be seen in FIG. 8 and 9, the frame 11 is provided with two side walls 14, 14' interconnected via a mutual back 13, between which side walls a long narrow gap 15 is delimited. The depth of the gap 15 is successively reduced in the direction towards the front or upper end of the frame. Also, the tooth protecting element 12 includes two side walls 16, 16' which are interconnected via a second back 17 and which define a second gap designated 18. The outsides of the side walls 14, 14' are planar as are the insides of the side walls 16, 16'. The width of the second gap 18 is generally equally large as the transverse distance between the outsides of the walls 14, 14'. In the area of the outside thereof, the back 13 of the frame has two material portions 19 corbelling out. These corbelling-out portions form stops that are abutted by planar edge surfaces 20 disposed on the element 12 when the handle assumes the working position according to FIG. 1. On at least one of the side walls 16, 16'; 14, 14', a tumbling 21 is provided which when pressed against an opposite side wall surface forms a friction means securing the tooth protecting element in the working position.

To form a hinge connection between the tooth protecting element 12 and the frame 11 of the gripping part, pairs of male members and seats are arranged, which may be brought to engagement with each other by snapping-in the male members into the seats. In the shown example, male members 22 in the shape of cylinder-shaped projections are arranged on the inside of the side walls 16, 16', which projections engage seats 23 in the shape of holes or recesses in backwardly projecting portions of the two side walls 14, 14' of the frame 11. Snapping-in of the male members 22 in the seats 23 is feasible by the fact that the two side walls 16, 16' of the tooth protecting element 12 are, to a certain extent, elastically resilient so that they may be bent apart far enough to enable the male members 22 to surround the projecting portions of the side walls 14, 14' and be led to engagement with the seats 23. Also, the projecting portions of these side walls 14, 14' may, at least to a certain extent, be elastically resilient to be able to approach each other in connection with snapping-in of the male members 22. By the fact that the male members 22—as is shown in FIG. 7—are separated from each other, the two gaps 15, 18 may merge into each other in the extended state of the tooth protecting element without being intersected by any transverse pivot pin. This means in turn that the toothing of the blade 1 may be located deeply inside the frame 11 and the tooth protecting element 12 in the area of the hinge connection, as can be seen in FIG. 6.

As may be best seen in FIG. 1, the frame 11 is, at the rear end thereof, provided with a shoulder 24, which cooperates with a transverse shoulder surface 25 on the front end of the tooth protecting element 12. When the tooth protecting element has been turned (approximately 180°) so that the surface 25 is pressed against the shoulder 24, the tooth protecting element 12 has reached an end position in which additional turning out is made impossible.

Reference is now made to FIG. 10–12 which illustrate how the locking mechanism 8 includes a tenon with a cylindrical shaft 26 and a head 27. This tenon is mounted in a bore 28 in the fastening part 4 extending transverse to the slit 6. Two axially spaced-apart waist portions 29, 30 of different diameters are provided on the shaft 26. In the edge portion on the rear end of the blade 1, two spaced-apart, substantially semicircular recesses 31, 32 are provided, the diameters of which generally correspond to the diameter of the thickest waist portion 29. By a spring 33, the tenon is normally kept in an outer end position in which the thickest waist portion 29 is located in the same plane as the slit 6, the tenon locking the blade in the desired position when it is in engagement with any of the recesses 31, 32. When the blade is to be released in order to permit turning, the tenon is pushed into the bore 28 against the action of the spring 33 to a position in which the thin waist portion 30 is located in the plane of the slit 6. By the fact that the waist portion 30 has a sufficiently small diameter in relation to the depth of the individual recesses 31, 32, the tenon moves, in this position, without interference from the recession, whereby the blade 1 may be turned from the first to the second of the two end positions which are determined by the recesses 31 and 32. In other words, the blade may be locked in relation to the fastening part 4 of the handle 2 in the working position according to FIG. 1 as well as the storing position according to FIG. 3.

In the state according to FIG. 1, i.e. when the tooth protecting element 12 is retracted towards the frame 11, the gripping part 5 is, in its entirety, of a substantially oval cross-sectional shape, as may be seen in FIG. 8. The gripping part 5 cross-section becomes reduced in the direction towards the upper transition portion 9. More precisely, the gripping part 5 is so provided that the major axis as well as the minor axis of the oval shaped cross-section are longest in the area of the free, lower half of the gripping part 5 and become gradually shorter towards the area of said transition portion 9. It should also be noted that the major axis in the oval cross-section lies in a common plane with the blade 1. This means that the gripping part 5 obtains maximum stiffness in the working direction of the saw. Furthermore, due to the oval cross-section shape, a tendency for the gripping part 5 to turn relative to a user's gripping hand is effectively counteracted.

The frame 11 together with the fastening part 4 connected thereto are in practice most suitably made of a strong and impact resistant plastic having a smooth surface, e.g. polyamide. Also the tooth protecting element 12 may advantageously be made of strong and impact resistant plastic, such as polyamide. On the outside thereof, the tooth protecting element 12 has, however, a surface layer illustrated with a screen pattern consisting of a thermoplastic polymer, the character of which is softer than, e.g. polyamide, and which furthermore has a rougher surface than this. By the fact that the frame 11 is comparatively narrow, this soft and rough surface extends along the major part of the circumference of the gripping part 5 in order to present an optimal grip for a gripping hand. This surface ends in the front part near the bottom of the concave recession 10. This means that the inside of the user's forefinger will abut the soft and rough surface material, while the outside of the finger will abut against the smooth plastic material of the frame 11 and the fastening part 4.

As may be seen in FIG. 3, the hinge 7 for the blade 1 is distanced so far from the frame 11 of the gripping part 5 that a short, front portion of the toothing 3 is exposed when the blade 1 assumes the retracted position. The fact that the upper portion of the frame 11 in connection with the transition portion 9 becomes slender in relation to the lower part of the frame 11 contributes also to a large extent to this exposure of a short portion of the toothing 3.

What is claimed is:

1. A handsaw comprising:
   a blade having a toothed cutting edge;
   a handle secured to the blade and including:
   a fastening part pivotably connected by a first hinge to an end of the blade to enable the blade to be swung between a forward working position and a rearward retracted position, and
   a gripping part extending rearwardly and downwardly from the fastening part at an obtuse angle relative thereto and including:
   a stiff frame integral with the fastening part and including a pair of first side walls spaced apart to form a first gap, and a first back wall interconnecting upper portions of the first side walls, whereby the first gap opens downwardly, and
   a tooth protecting element including a pair of second side walls spaced apart to form a second gap sized to receive said stiff frame, the second side walls being interconnected by a second back wall, the tooth-protecting element being pivotably connected to a rear end of the stiff frame by a second hinge, to enable the tooth-protecting element to be swung from a forward working position in which the second gap receives at least a portion of the stiff frame, and a rearward retracted portion wherein the first and second gaps are aligned to receive the blade when the blade is in its retracted position, and
   a releasable locking mechanism for locking the blade against rotation about the first hinge,
   the fastening part and the frame being configured such that when the blade is in the retracted position, a portion of the toothed cutting edge is visible.

2. The handsaw according to claim 1 wherein the frame and the tooth protecting element comprise an impact resistant plastic, the tooth protecting element being lined on its exterior with a layer of soft thermoplastic polymer forming a rough outer surface of the gripping part.

3. The handsaw according to claim 2 wherein the frame includes a transition portion merging with the fastening part, the transition portion being thinner than the fastening part, a lower portion of the fastening part extending downwardly past the transition portion to form a recessed area adapted to receive a user's forefinger, a front end of the tooth protecting element and its layer of soft thermoplastic polymer terminating adjacent the recessed area.

4. A handsaw comprising:
   a blade having a toothed cutting edge;
   a handle secured to the blade and including:
   a fastening part pivotably connected by a first hinge to an end of the blade to enable the blade to be swung between a forward working position and a rearward retracted position, and
   a gripping part extending rearwardly and downwardly from the fastening part at an obtuse angle relative thereto and including:
   a stiff frame integral with the fastening part and including a pair of first side walls spaced apart to form a first gap, and a first back wall interconnecting upper portions of the first side walls, whereby the first gap opens downwardly, and
   a tooth protecting element including a pair of second side walls spaced apart to form a second gap sized to receive said stiff frame, the second side walls being interconnected by a second back wall, the tooth-protecting element being pivotably connected to a rear end of the stiff frame by a second hinge, to enable the tooth-protecting element to be swung from a forward working position in which the second gap receives at least a portion of the stiff frame, and a rearward retracted portion wherein the first and second gaps are aligned to receive the blade when the blade is in its retracted position, the second hinge defined by projections disposed on one of the first and second pairs of side walls and recesses disposed in the other of the first and second pairs of side walls, the second hinge disposed at an end of the stiff frame located remotely of the fastening part, the pair of second side walls being elastically flexible to enable the projections to become engaged and disengaged from the respective recesses, and
   a releasable locking mechanism for locking the blade against rotation about the first hinge.

5. The handsaw according to claim 4 wherein the frame and the tooth protecting element comprise an impact resistant plastic, the tooth protecting element being lined on its exterior with a layer of soft thermoplastic polymer forming a rough outer surface of the gripping part.

6. The handsaw according to claim 5 wherein the frame includes a transition portion merging with the fastening part, the transition portion being thinner than the fastening part, a lower portion of the fastening part extending downwardly past the transition portion to form a recessed area adapted to receive a user's forefinger, a front end of the tooth protecting element and its layer of soft thermoplastic polymer terminating adjacent the recessed area.

7. The handsaw according to claim 4 wherein the projections are disposed on the tooth protecting element.

* * * * *